(12) United States Patent
Royer et al.

(10) Patent No.: US 7,587,577 B2
(45) Date of Patent: Sep. 8, 2009

(54) PIPELINED ACCESS BY FFT AND FILTER UNITS IN CO-PROCESSOR AND SYSTEM BUS SLAVE TO MEMORY BLOCKS VIA SWITCH COUPLING BASED ON CONTROL REGISTER CONTENT

(75) Inventors: Marc E. Royer, Garland, TX (US); Bharath M. Siravara, Issaquah, WA (US); Steven C. Bartling, Plano, TX (US); Charles M. Branch, Dallas, TX (US); Pedro R. Galabert, Allen, TX (US); Neeraj Mogotra, Richardson, TX (US); Samil D. Kamath, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 41 days.

(21) Appl. No.: 11/557,755

(22) Filed: Nov. 8, 2006

(65) Prior Publication Data
US 2007/0113048 A1 May 17, 2007

Related U.S. Application Data

(60) Provisional application No. 60/736,436, filed on Nov. 14, 2005.

(51) Int. Cl.
*G06F 13/00* (2006.01)
(52) U.S. Cl. ............................. 712/34; 711/147; 712/225
(58) Field of Classification Search .................... None
See application file for complete search history.

(56) References Cited

U.S. PATENT DOCUMENTS

| 5,471,592 | A   | * | 11/1995 | Gove et al. ............... 709/213 |
| 5,564,107 | A   | * | 10/1996 | Atalla ..................... 712/30 |
| 6,630,964 | B2  | * | 10/2003 | Burns et al. ............... 348/554 |
| 2004/0225840 | A1 | * | 11/2004 | O'Connor et al. .......... 711/122 |

OTHER PUBLICATIONS

Crochiere et al., Multirate Digital Signal Processing (Prentice-Hall, 1983), pp. 303-310.

* cited by examiner

*Primary Examiner*—Kenneth S Kim
(74) *Attorney, Agent, or Firm*—John J. Patti; Wade J. Brady, III; Frederick J. Telecky, Jr.

(57) ABSTRACT

A system architecture including a co-processor and a memory switch resource is disclosed. The memory switch includes multiple memory blocks and switch circuitry for selectably coupling processing units of the co-processor, and also a bus slave circuit coupled to a system bus of the system, to selected ones of the memory blocks. The memory switch may be constructed as an array of multiplexers, controlled by control logic of the memory switch in response to the contents of a control register. The various processing units of the co-processor are each able to directly access one of the memory blocks, as controlled by the switch circuitry. Following processing of a block of data by one of the processing units, the memory switch associates the memory blocks with other functional units, thus moving data from one functional unit to another without requiring reading and rewriting of the data.

14 Claims, 7 Drawing Sheets

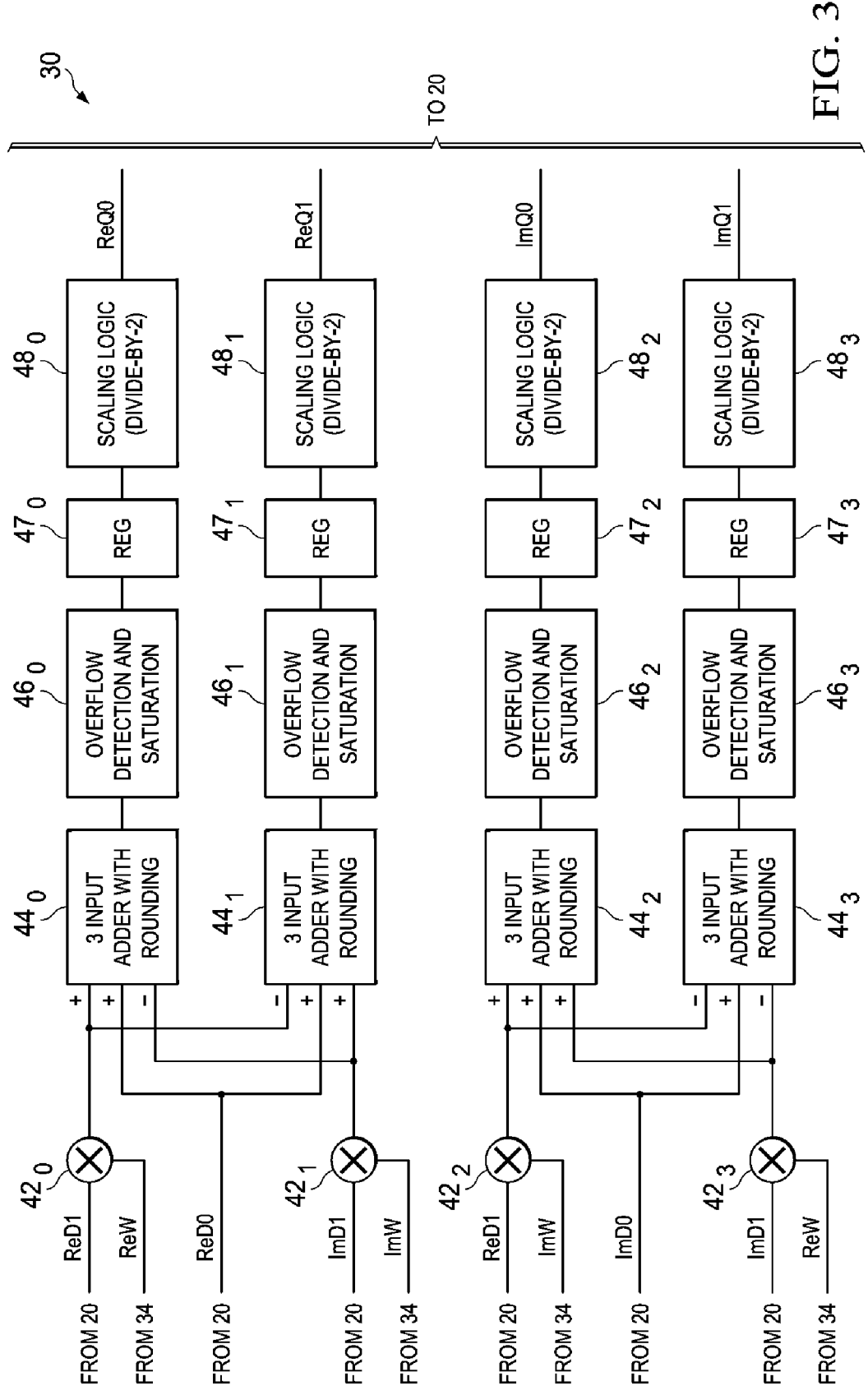

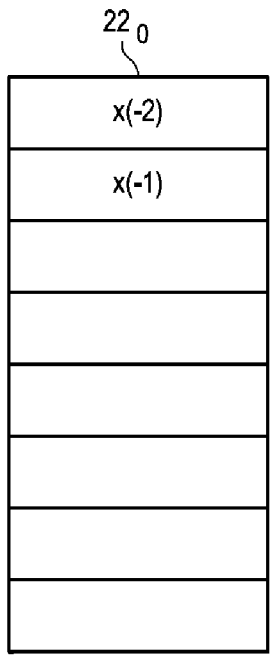
FIG. 8a
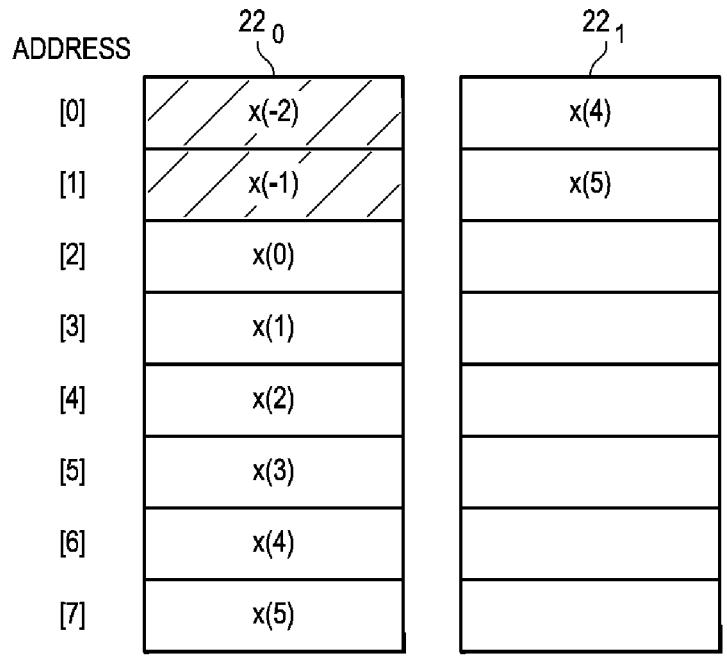
FIG. 8b
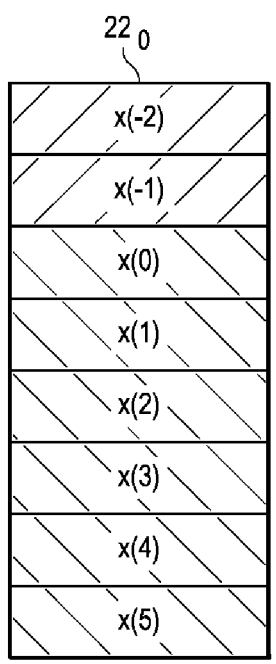 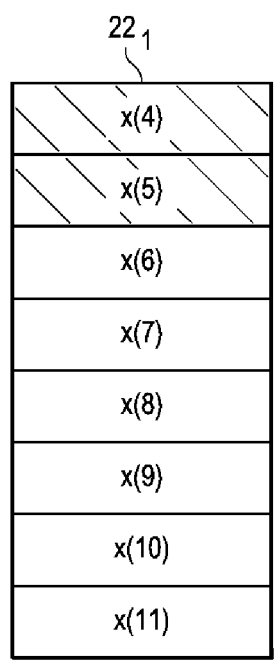 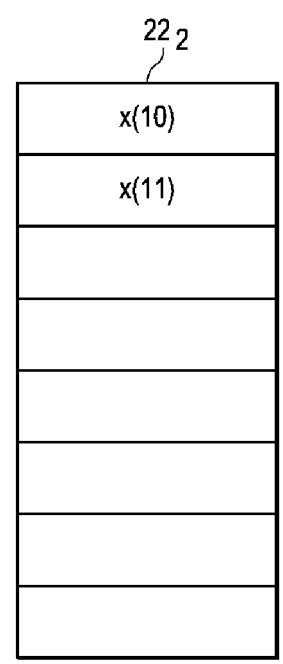
FIG. 8c

PIPELINED ACCESS BY FFT AND FILTER UNITS IN CO-PROCESSOR AND SYSTEM BUS SLAVE TO MEMORY BLOCKS VIA SWITCH COUPLING BASED ON CONTROL REGISTER CONTENT

CROSS-REFERENCE TO RELATED APPLICATIONS

This application claims priority, under 35 U.S.C. §119(e), of Provisional Application No. 60/736,436, filed Nov. 14, 2005, which is incorporated herein by this reference.

STATEMENT REGARDING FEDERALLY SPONSORED RESEARCH OR DEVELOPMENT

Not applicable.

BACKGROUND OF THE INVENTION

This invention is in the field of processing circuitry architecture, and is more specifically directed to memory management for co-processing architectures.

As is fundamental in modern computer architectures, virtually all computer or processing architectures include input and output functions, a control function, arithmetic and logic functionality, and memory. And as is also fundamental in the art, efficient communication of information between the memory resources and the arithmetic and logic unit (ALU) is important in achieving high system performance. As such, many advances have been made in computing and processing architectures to improve this functionality, such advances including higher-speed and wider datapaths between memory and the central processing unit (CPU), cache memory hierarchies to improve the efficiency of data retrieval and storage for often-accessed memory locations, and of course higher-speed semiconductor memory technologies.

Of course, another significant factor in overall processing system performance is the rate at which the CPU or ALU can execute its arithmetic and logical operations. As known in the art, huge advances have also been made in the speed at which the processing circuitry executes instructions, reflected by the "clock rate" of modern microprocessors. In addition, architectural advances including the use of multi-state instruction pipelines in modern CPUs, and multiple processor "cores", have had dramatic impact in the computational capacity of modern processing systems.

The use of "co-processors" in modern processing systems has also greatly provided substantial performance improvement. As fundamental in the art, a co-processor is typically a special purpose arithmetic and logical unit, designed to rapidly and efficiently execute certain types of operations, usually complex arithmetic operations. Examples of co-processors include floating-point units (ALUs constructed to perform floating-point arithmetic), and digital signal processor co-processors (ALUs constructed to rapidly perform multiply-and-add operations). In a typical co-processor system, the main CPU will "call" a routine for execution by the co-processor, in response to which the co-processor will access memory to execute its specific arithmetic operation on stored data, and store the results in memory for later access by the main CPU. Use of a co-processor in a system enables the main CPU to be constructed as a relatively modest general purpose processor, while still obtaining high-performance execution of complex arithmetic instructions and routines.

However, the implementation of a co-processor into a computing system complicates system operation, to some extent. The co-processor particularly impacts memory management in the system, because the co-processor must have access to the input data on which it is to operate, and must also have access to a memory resource to store the results of its operation. This co-processor memory management can be effected by permitting the co-processor to access the same main memory as the main CPU, which requires the management of access to the main memory to avoid conflicts in access from the CPU and co-processor, and to avoid issues of data coherency because the memory is accessible to multiple functions. The co-processor need not have access to the main memory if the system is arranged so that the CPU "passes" the input data to the co-processor and so that the co-processor "passes" the results back to the CPU. In this manner, the CPU can manage all accesses to main memory, avoiding the possibility of conflict and coherency issues; however, substantial computing capacity becomes occupied by the transfer of data in this manner. These and other tradeoffs must be faced by the system architect in the design of the system.

Many important advances have also been made in the miniaturization and portability of modern computer systems. These advances have enabled small electronic systems to perform highly advanced computing tasks, thus providing digital computing functionality in a wide range of applications. For example, these advances are beginning to enable the use of digital signal processing techniques in battery-powered miniaturized hearing aids, to improve the sound and intelligibility of amplified sound for the hearing-impaired. For example, a common problem faced by hearing aid wearers in the past was due to conventional hearing aids amplifying noise along with the desired speech or sound, making the hearing aid effectively useless in noisy environments such as restaurants and arenas. It is contemplated that digital signal processing techniques can more intelligently amplify the desired sound rather than noise, providing great improvement in the intelligibility of the sound.

Of course, battery life and thus system power consumption is a significant issue in portable computing systems. Hearing aids are especially sensitive to battery life. As mentioned above, the use of a co-processor to perform specific complex arithmetic functions, such as digital signal processing routines, is attractive in providing high system performance without requiring highly advanced CPUs. However, the passing of data to and from the co-processor, either via the CPU or by way of the co-processor directly accessing main memory, necessarily involves substantial power consumption. For example, in a conventional co-processor system, the co-processor reads or receives the input data, stores that input data in its memory, stores the results of its computations in its memory, and writes those results (directly, or via a CPU) into the main memory for use by the CPU. The power consumption involved in these memory accesses, as repeatedly performed in digital signal processing routine such as a Discrete Fourier Transform or digital filter, can be significant, especially in miniature battery-powered systems such as hearing aids.

BRIEF SUMMARY OF THE INVENTION

It is therefore an object of this invention to provide a processing architecture and method of operating the same in which memory accesses required for co-processor execution are reduced.

It is a further object of this invention to provide such an architecture and method that can be applied to a wide range of co-processing functions.

It is a further object of this invention to provide such an architecture and method that is especially well-suited for digital signal processing operations.

It is a further object of this invention to provide such an architecture and method that can be applied to multiple co-processing functions operating in sequence on blocks of data.

Other objects and advantages of this invention will be apparent to those of ordinary skill in the art having reference to the following specification together with its drawings.

The present invention may be implemented into a processing system including a co-processor including one or more processing functions, a central processing unit (CPU), and a memory coupled to the co-processor via a memory switch. Data to be operated on by the co-processor is stored in the memory, in one of a plurality of memory blocks in the memory. The memory switch associates the memory blocks with the processing functions in the co-processor, so that a memory access by one of the processing functions accesses the associated memory block. After execution of a routine, the memory switch associates a different memory block to the processing functions of the co-processor.

BRIEF DESCRIPTION OF THE SEVERAL VIEWS OF THE DRAWING

FIG. 3 is an electrical diagram, in block form, of the construction of an FFT unit in the co-processor of FIG. 2a, constructed according to the preferred embodiment of the invention.

FIGS. 8a through 8c are memory maps illustrating an overlapped FFT operation executed by the co-processor of a system constructed according to the preferred embodiment of the invention.

DETAILED DESCRIPTION OF THE INVENTION

The present invention will be described in connection with its preferred embodiment, namely as implemented into a system including a digital signal processor (DSP) as a co-processor, because it is contemplated that this invention will be especially beneficial when implemented into such a system. However, it is also contemplated that this invention will be useful and beneficial in a wide range of systems, system architectures, and system applications. Accordingly, it is to be understood that the following description is provided by way of example only, and is not intended to limit the true scope of this invention as claimed.

Figure 1:
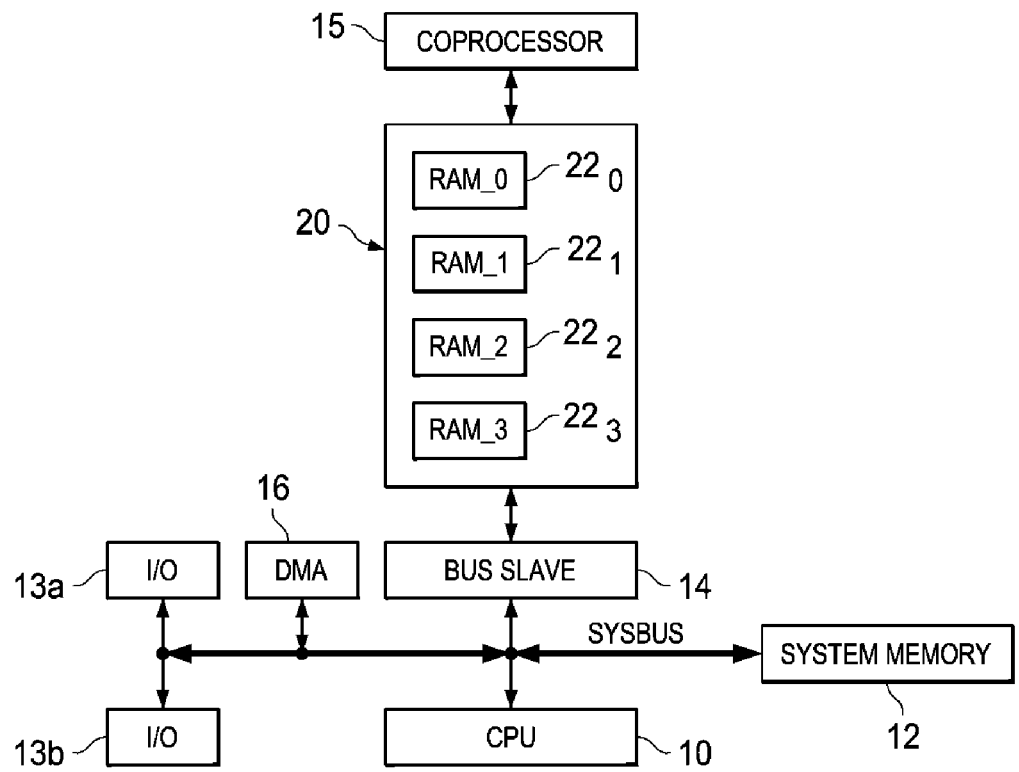
FIG. 1 is an electrical diagram, in block form, of a processing system architecture constructed according to the preferred embodiment of the invention.

FIG. 1 illustrates, in the form of a block diagram, the construction of a computing or processing system constructed according to the preferred embodiment of the invention. The system of FIG. 1 includes central processing unit (CPU) 10, which includes and operates as the main system control unit, and the main arithmetic and logic unit (ALU) of the system. Of course, the control and ALU functions may be realized by separate functions or devices, as desired for the system environment. In any case, CPU 10 is coupled to system memory 12 over system bus SYSBUS. In this high level architectural diagram, system memory 12 includes both program memory and data memory, arranged in a single memory address space or as multiple memory address spaces, and may include either or both of non-volatile and random access memory, depending on the particular system requirements. CPU 10 is also coupled to one or more input/output functions 13a, 13b over system bus SYSBUS, for accomplishing the desired system functionality. For example, the system of FIG. 1 may realize a hearing aid device, in which case input/output function 13a may correspond to an audio input device (e.g., microphone) and input/output function 13b may correspond as an audio output device (e.g., speaker). Direct memory address (DMA) engine 16 is also coupled to system bus SYSBUS in this example, and is useful for copying or moving data into and out of system memory 12 without involving CPU 10, as known in the art.

Other functions and devices may, of course, also be included within the system, but are not shown in FIG. 1 for the sake of clarity. For example, it is contemplated that power management circuitry will typically be included, for receiving one or more external power supply voltages (e.g., from a battery or power adapter) and for producing regulated or unregulated voltages to the various integrated circuits and functions included within the system. In addition, clock and timing circuitry is also typically realized within the system, for generating synchronous clock signals for the various system functions, for example based on an external crystal or based on a clock signal recovered from an incoming input signal. Interface circuitry, and also special purpose analog and digital circuits, may also be included within the system as appropriate for the system application.

According to the preferred embodiment of the invention, co-processor 15 is also included in the system, for rapidly executing specific complex arithmetic or logical operations. For example, as will become apparent from the following description, co-processor 15 may include special purpose digital signal processor (DSP) circuitry for rapidly and efficiently executing DSP routines. Examples of such DSP routines and functions include Discrete Fourier Transform (DFT) operations (a special type of which is referred to as "Fast" Fourier Transforms, or FFTs) and their inverses, and digital filter banks. Other types of co-processor functionality may be included within, or instead of, these DSP functions of co-processor 15. As conventional in the art, it is contemplated that co-processor 15 will typically perform its calculations and functions upon a block or stream of data provided to it from CPU 10 (directly or indirectly), without particular knowledge of the overall process or function being performed by the system; as such, co-processor 15 will provide a block or stream of results based on its execution of the desired functions.

According to the preferred embodiment of the invention, memory switch 20 is used as data memory for co-processor 15. In this regard, memory switch 20 is a conduit for passing to co-processor 15 the data upon which it is to operate, and for receiving the results of those operations from co-processor 15. In the example of FIG. 1, system bus SYSBUS is coupled to memory switch 20 by way of bus slave 14. According to this implementation of the preferred embodiment of the invention, bus slave 14 provides an interface by way of which data can be written to and read from memory switch 20, either in direct communication with system memory 12 through the operation of DMA engine 16, or through the operation of CPU 10.

According to this preferred embodiment of the invention, memory switch 20 includes multiple memories, or memory blocks, $22_0$ through $22_3$. As will be evident from the following description, memory switch 20 also includes circuitry for associating each of memory blocks 22 with a processing function within co-processor 15, or with bus slave 14. According to the preferred embodiment of the invention, memory blocks 22 are preferably constructed as random access memory, realized as individual memory resources or as portions of a unitary memory (i.e., mapped portions or arrays within a single address space), with both reads and writes being synchronous operations. Alternatively, memory blocks 22 may be realized as two-port register files, as known in the art, in which case read operations may be asynchronous. It is contemplated that the size of memory blocks 22 will generally be relatively modest relative to system memory 12, for example with each memory block 22 including 128 entries of thirty-two bits each.

According to the preferred embodiment of the invention, it is preferably that each memory block 22 be constructed so that it is independently enabled (or disabled) without regard to the state of the other memory blocks 22. In this way, only those memory blocks 22 in use by co-processor 15 or in communication with CPU 10 via bus slave 14 need be enabled. For example, memory blocks $22_0$ through $22_3$ may have distinct "word lines" from one another, such that the access of a single memory location (i.e., register) in a single memory block $22_j$ requires energizing of a word line only for that register in that memory block $22_j$, and not in any of the other memory blocks 22.

Figure 2A:
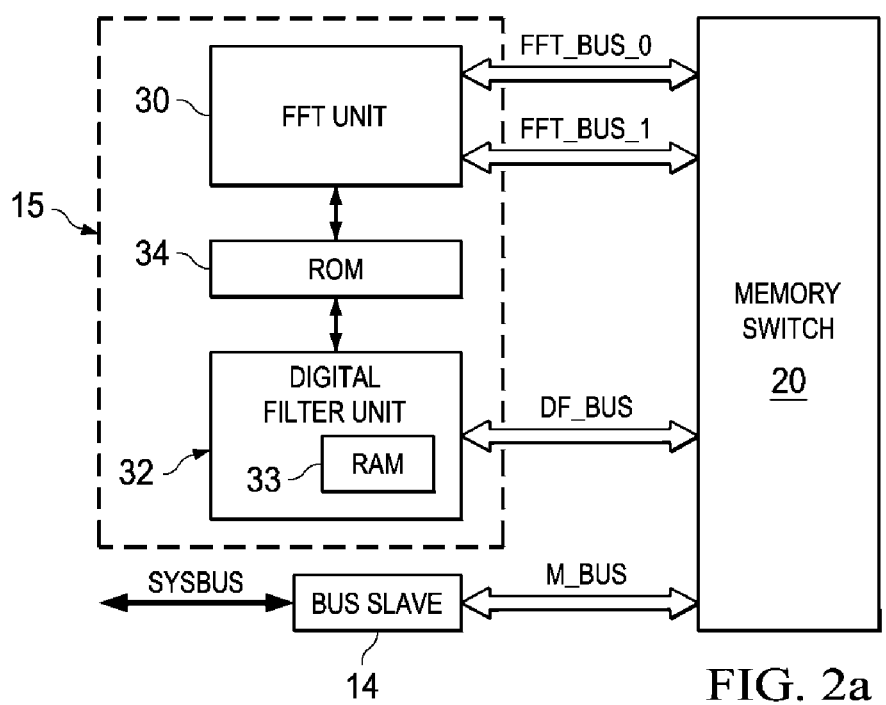
FIGS. 2a and 2b are electrical diagrams, in block form, of the co-processor and memory switch in the system of FIG. 1, constructed according to the preferred embodiment of the invention.
Figure 2B:
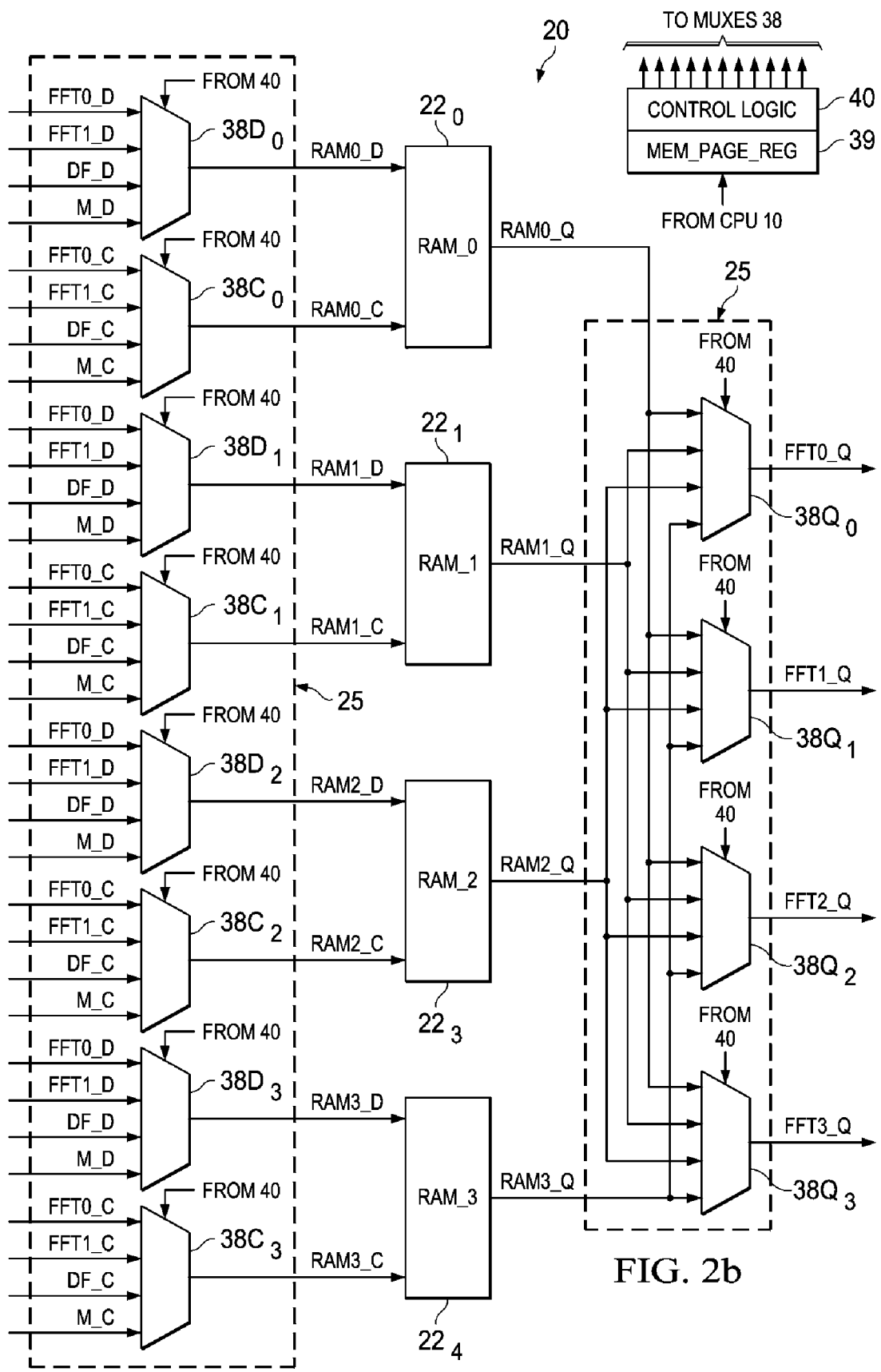

FIGS. 2a and 2b illustrate, in further detail, the construction and interoperation of memory switch 20 in combination with co-processor 15 and bus slave 14. FIG. 2a illustrates, in block form, the construction of co-processor 15 and its relationship with memory switch 20, while FIG. 2b illustrates the construction of memory switch 20 in further detail.

As shown in FIG. 2a for this preferred embodiment of the invention, co-processor 15 includes FFT unit 30 as one processing function, and digital filter unit 32 as another processing unit. Co-processor 34 also includes read-only memory (ROM) 34, which stores weighting factors ("twiddle" factors) for use in the FFT carried out by FFT unit 30, and coefficients for known digital filters implemented by digital filter unit 32 (e.g., window filter coefficients). Of course, co-processor 15 may include other processing units, memory resources, and the like instead of or in addition to those shown in FIG. 2a, depending on the particular application of co-processor 15 in the system.

Each of FFT unit 30 and digital filter unit 32 are in communication with memory switch 20, by way of local buses. In this example, FFT unit 30 is coupled to memory switch 20 by way of two buses, FFT_BUS_0 and FFT_BUS_1. According to this embodiment of the invention, each of these buses, as well as the other buses shown in FIG. 2a, include input data lines (i.e., unidirectional from FFT unit 30 to memory switch 20), output data lines (i.e., unidirectional from memory switch 20 to FFT unit 30), and control lines over which address and control signals are communicated to memory switch 20. Similarly, digital filter unit 32 is coupled to memory switch 20 via bus DF_BUS, and bus slave 14 is coupled to memory switch 20 via bus M_BUS. Each of these buses FFT_BUS_0, FFT_BUS_1, DF_BUS, and M_BUS are preferably constructed similarly as one another; as will be described in further detail below, it may be preferable to include additional address lines within the control portion of bus M_BUS, to permit bus slave 14 to present a page address that can specify one of memory blocks 22, as will be described in further detail below.

According to this embodiment of the invention, FFT unit 30 is constructed as logic circuitry that is specifically arranged to efficiently perform multiply-and-add operations, as useful in FFT and inverse FFT routines. By way of example, FIG. 3 illustrates the construction of FFT unit 30 according to the preferred embodiment of the invention. The reader should bear in mind, however, that FFT unit 30 may be constructed according to other arrangements, whether as custom logic, semi-custom logic, or programmable logic that is arranged or programmed, as the case may be, to perform the FFT functions.

As is fundamental in the digital signal processing art, the Fast Fourier Transform (FFT) operation and its inverse (IFFT) is based on a sequence of multiply-and-add operations. According to this preferred embodiment of the invention, as will become apparent from this specification, the "in-place" FFT (or IFFT) is capable of operating on a block of data retrieved from memory, and replacing that data with the results of the FFT or IFFT operation, in the same memory locations. Such in-place FFT or IFFT operations, as known in the art, are executed as a sequence (i.e., the well-known "butterfly" sequence) of complex arithmetic operations between two operands D0 and D1, together with a complex weight factor (also referred to as the "twiddle" factor) W, to produce complex output values Q0 and Q1 as follows:

$$Q0 = D0 + W(D1)$$

$$Q1 = D0 - W(D1)$$

where all operations (addition, subtraction, and multiplication) are complex. To expand these two computations to illustrate the operations applied to the real and imaginary portions of these operands:

$$Re[Q0] = \{(Re[W])(Re[D1]) + Re[D0] - (Im[W])(Im[D1])\}/2$$

$$Im[Q0] = \{(Im[W])(Re[D1]) + Im[D0] + (Re[W])(Im[D1])\}/2$$

$$Re[Q1] = \{-(Re[W])(Re[D1]) + Re[D0] + (Im[W])(Im[D1])\}/2$$

$$Im[Q1] = \{-(Im[W])(Re[D1]) + Im[D0] - (Re[W])(Im[D1])\}/2$$

where "Re" and "Im" designate the real and imaginary parts of each complex value.

These operations are performed by the circuitry of FIG. 3, according to this example of the implementation of FFT unit 30. Preferably, each of the complex operands D0, D1, W and the complex result values Q0, Q1 are stored as thirty-two bit values, for example with the most significant sixteen bits being a signed magnitude of the real portion of the operand, and the least significant sixteen bits being a signed magnitude of the imaginary portion of the operand. And, according to this embodiment of the invention, operands D0, D1 are retrieved from one of memory blocks 22 of memory switch 20, twiddle factor W is retrieved from ROM 34 within co-processor 15, and results Q0, Q1 are stored back into the same memory locations in the same memory block 22 from which operands D0, D1 were retrieved. In this regard, both the retrieval of operands and the storing of results carried out by FFT unit 30 are executed in connection with an addressing scheme that corresponds to the FFT or IFFT operation being carried out. Control logic (not shown) is included within FFT unit 30 to sequence these memory addresses, according to conventional FFT and IFFT techniques.

As shown in FIG. 3, FFT unit 30 is arranged as four circuitry legs, each of which calculates one of the results Re[Q0], Im[Q0], Re[Q1], and Im[Q1]. Referring to one of these legs by way of example, multiplier $42_0$ receives the most significant sixteen-bit portion of operand D1 (i.e., Re[D1]) from memory switch 20 at one input, and the most significant sixteen-bit portion of twiddle factor W (i.e., Re[W]) from ROM 34 at another input, and produces a product value that is applied to one input of adder $44_0$. The most significant sixteen-bit portion of operand D0 is applied to a second input of adder $44_0$. And a third input of adder $44_0$ receives the product output from multiplier $42_1$, which receives the least significant sixteen-bit portion of operand D1 (i.e., Im[D1]) from memory switch 20 at one input, and the least significant sixteen-bit portion of twiddle factor W (i.e., Im[W]) from ROM 34 at another input. According to this arrangement, given the equations specified above and considering that the operands are expressed as signed binary values, the value presented at the output of multiplier $42_1$ is converted to its 2's complement and then summed within adder $44_0$ (so that its value is subtracted) with the values at the other two inputs to adder $44_0$.

Adder $44_0$ is a three-input adder, with rounding, having an output at which it presents the sum of the three values presented at its three inputs (with these values converted to 2's complement for subtraction, as the case may be), according to the conventional logic arrangement for such an adder. The other adders $44_1$, through $44_2$ are similarly constructed, but have a different pattern of inputs to be added or subtracted, as shown in FIG. 3 by the + and − indicators, and corresponding to the equations given above. The output of each adder 44 is applied to an input of a corresponding overflow detection and saturation circuit 46, constructed in the conventional manner for detecting whether the sum presented by its corresponding adder is in an overflow or underflow situation, and for clipping that overflow or underflow result to a desired maximum or minimum output level.

The output of each overflow detection and saturation circuit 46 is applied to a corresponding pipeline register 47. Each pipeline register 47 effectively buffer the result of the multiply-and-add operation performed by its corresponding multiplier 44 and adder 46, as modified by its overflow detection and saturation circuit 46, to permit FFT unit 30 to begin calculations for a next input pair to the butterfly operation, in a pipelined manner. Alternatively, pipeline registers 47 may be omitted from FFT unit 30 if pipelining of the FFT/IFFT operation is not desired. Finally, the result of the multiply-and-add operation is scaled, by a right-shift or divide-by-2 operation performed by scaling logic 48, to produce the final result according to the equations specified above, and as known in the art for FFT and IFFT operations.

The outputs of the scaling logic functions $48_0$ through $48_3$ thus present the four results Re[Q0], Im[Q0], Re[Q1], and Im[Q1]. These values are then forwarded to memory block 22 of memory switch 20 for storage, preferably in the same memory locations from which operands D0 and D1 were retrieved, with the same ordering of real and imaginary portions in those memory locations (e.g., the real portion in the most significant sixteen bits, and imaginary portion in the least significant sixteen bits).

In this regard, if an FFT butterfly operation is to be performed within a single instruction cycle of FFT unit 30, this will require a single cycle read/write operation to be performed from four separate addresses (two addresses for reads, and two addresses for writes) in the associated memory bank 22. As such, it is preferred that memory blocks 22 operate at four times the rate as co-processor 15, to permit the reading and writing of these operands and results.

Figure 4:
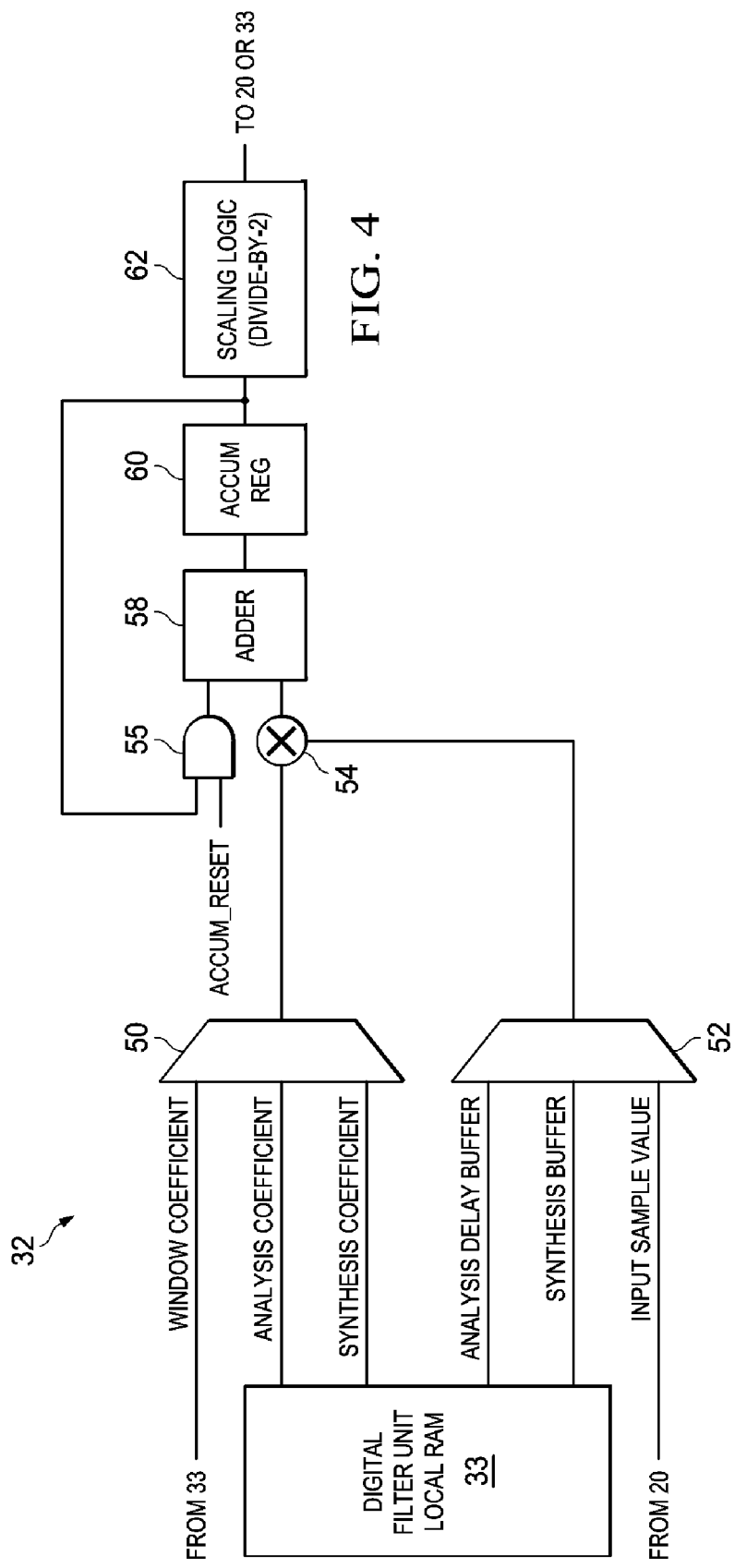
FIG. 4 is an electrical diagram, in block form, of the construction of a digital filter unit in the co-processor of FIG. 2a, constructed according to the preferred embodiment of the invention.

FIG. 4 illustrates the construction of digital filter unit 32 according to the preferred embodiment of the invention. As known in the art, digital filter operations are based on a sequence of multiply-and-accumulate operations. For example, in time-segment digital signal processing, the "analysis" stage divides an input signal into segments or blocks of fixed or variable length, and the "synthesis" stage recombines these blocks, from the analysis stage, into an output signal. The basic digital filter operation of multiply-and-accumulate is used in both the analysis and synthesis stages of time-segment digital signal processing, of course requiring that the results of the analysis stage be stored as intermediate results to the overall filter operation.

As is fundamental in the digital filter art, the z-domain transfer function H(z) of a basic finite impulse response filter of order k can be expressed as:

$$H(z) = \sum_{m=0}^{k} a_m z^{-m}$$

where $z^{-1}$ is the delay operator in discrete sequence arithmetic. As such, and as fundamental in this art, a finite impulse response filter is typically implemented by an accumulation of a sequence of discrete input sample values from a current sample value x(m) and its previous k sample values, each sample value multiplied by a corresponding coefficient a. This function can thus be readily realized by a sequence of multiply and accumulate operations.

FIG. 4 illustrates a data flow diagram for such multiply-and-accumulate operations, as carried out in digital filter unit 32 according to this embodiment of the invention. While a single multiply-and-accumulate function is illustrated in FIG. 4, and is itself sufficient for carrying out digital filter operations over a sequence of iterations, it is contemplated that digital filter unit 32 may be realized as an "array" of such functions, depending on the filter design and the order of the filter. It is contemplated that the description of FIG. 4 provided in this specification will be sufficient for those skilled in the art to readily construct digital filter unit 32 according to such arrangements and other alternative realizations.

In the example of FIG. 4, coefficient multiplexer 50 receives coefficient values (i.e., the a value in the above FIR equation) from a number of possible sources. For example, a typical digital filter function is a window function, for which the coefficients may be pre-stored in ROM 33, and as such one input to coefficient multiplexer 50 is coupled to ROM 33. Other coefficients, for example as used in conventional analysis and synthesis time-segment processing, may be temporarily stored or calculated in-process, and are applied at inputs to coefficient multiplexer 50 from local RAM 33 within FFT unit 32. Sample multiplexer 52 similarly receives inputs from multiple sources, the selected input corresponding to the sample value x(m) (current or delayed) for the filter operation. One input to sample multiplexer 52 is coupled to memory switch 20, either directly or via a buffer within digital filter unit 32 (not shown), which provides current sample values to digital filter unit 32. Other sample values may be previously calculated filter results, or delayed values of the sample stream, that are temporarily stored within local RAM 33 of digital filter unit 32; as such, sample multiplexer 52 receives inputs from local RAM 33 corresponding to previously stored values in the analysis stage (i.e., delayed sample values), or in the synthesis stage (i.e., previously stored results). The control of the selections made by coefficient multiplexer 50 and sample multiplexer 52, and also the generation of addresses for retrieving operands and storing results, is performed by control logic (not shown) within digital filter unit 33, according to conventional techniques.

The output of coefficient multiplexer 50 is applied to one input of multiplier 54, and the output of sample multiplexer 52 is applied to another input of multiplier 54. These selected coefficient and sample values are multiplied by multiplier 54, which is a conventional digital multiplier, for example a sixteen-bit multiplier for multiplying signed sixteen-bit digital values. The output of multiplier 54 is coupled to an input of adder 58. Adder 58 and accumulator register 60, which has an input coupled to an output of adder 58, together operate as an accumulator, considering that the output of accumulator register 60 is fed back to an input of adder 56. In this example, logic function 55 couples the output of accumulator register 60 to the input of adder 58, to permit clearing of the contents of accumulator register 60 by blocking the adding of its previously stored value, in response to control signal accum_ reset from control logic within digital filter unit 32.

Accordingly, in operation, multiplier 54 multiplies the sample value selected by sample multiplexer 52 by the coefficient selected by coefficient multiplexer 50. The product of the multiplication by multiplier 54 is summed with the previous contents of accumulator register 60, to create a new sum that is then stored within accumulator register 60. This operation amounts to a multiply-and-accumulate operation, as evident from this description.

Scaling logic 62, for example a right-shifter or divide-by-two function, is coupled to the output of accumulator register 60, to scale down the accumulated sum, as known in the art for many digital filter functions. The output of scaling logic 62, corresponding to one value output by the digital filter that is implemented, is then forwarded to memory switch 20, or alternatively to local RAM 33 within digital filter unit 32 for use in a subsequent operation.

As mentioned above, the particular construction of FFT unit 30 and digital filter unit 32 may vary from that described relative to FIGS. 3 and 4; indeed, the functions performed by co-processor 15, and thus the particular circuitry and functional units included within co-processor 15, may vary from that described in this specification. It is contemplated and therefore should be understood that this description of co-processor 15 and of FFT unit 30 and digital filter unit 32 is provided by way of example only.

Referring back to FIG. 2a, and as mentioned above, FFT unit 30 of co-processor 15 is coupled to memory switch 20 by way of two separate buses FFT_BUS0 and FFT_BUS1, and digital filter unit 32 is coupled to memory switch 20 by way of bus DF_BUS. Bus slave 14 is also coupled to memory switch 20 by way of bus M_BUS. Referring now to FIG. 2b, the operative connection of buses FFT_BUS0, FFT_BUS1, DF_BUS, and M_BUS to memory switch 20, and the construction of memory switch 20 itself, will now be described.

In a general sense, memory switch 20 includes memory blocks $22_0$ through $22_3$ (for the example of four memory blocks 22), and switch 25, which selectably couples external buses to these memory blocks 22, as directed by control logic 40. Preferably, switch 25 can couple each bus (i.e., buses FFT_BUS0, FFT_BUS1, DF_BUS, and M_BUS) to any one of memory blocks $22_0$ through $22_3$, in the manner of a crossbar switch. Of course, not all buses need be coupled to a memory block 22, and not all memory blocks 22 need be coupled to a bus. Preferably, those memory blocks 22 that are not coupled to a bus at a given time are disabled by control logic 40 (e.g., their word lines not energized during the access of a memory location in another memory block 22), to save system power as discussed above.

According to the preferred embodiment of the invention, as shown in FIG. 2b, switch 25 is constructed as an array of multiplexers 38. It is contemplated that the construction of switch 25 as an actual crossbar switch would tend to be cumbersome, and involve substantial chip area and power consumption. According to the preferred embodiment of the invention, therefore, it is contemplated that the realization of switch 25 as multiplexers 38 will be efficient in power and chip area.

As mentioned above, it is contemplated that each of buses FFT_BUS0, FFT_BUS1, DF_BUS, and M_BUS will include input data lines (for data written to memory blocks 22), output data lines (for data read from memory blocks 22), and control lines including address and other control signals. According to the realization of FIG. 2b, referring to memory block $22_0$ by way of example, switch 25 includes three multiplexers $38D_0$, $38C_0$, and $38Q_0$, which control the selection of input data buses, control/address buses, and output buses, respectively. More specifically, multiplexer $38D_0$ selects one set of input data lines from among input data lines FFT0_D of bus FFT_BUS0, input data lines FFT1_D of bus FFT_BUS1, input data lines DF_D of bus DF_BUS, and input data lines M_D of bus M_BUS. Similarly, multiplexer $38C_0$ selects one set of control (i.e., control and address) lines from among control lines FFT0_C of bus FFT_BUS0, control lines FFT1_C of bus FFT_BUS1, and control lines DF_C of bus DF_BUS, and control lines M_C of bus M_BUS. On the output side, multiplexer $38Q_0$ selects one set of output data lines from among output data lines RAM0_Q from memory block $22_0$, RAM1_Q from memory block $22_1$, RAM2_Q from memory block $22_2$, and RAM3_Q from memory block $22_3$, for coupling to lines FFT0_Q of bus FFT_BUS0. Of course, the three multiplexers $38D_0$, $38C_0$, and $38Q_0$ associated with memory block $22_0$ will coherently couple the same bus to the same memory block, such that memory block $22_0$ will be in communication, for both read and write functions, with one and only one of buses FFT_BUS0, FFT_BUS1, DF_BUS, and M_BUS.

The sets of multiplexers 38 associated with the other memory blocks $22_1$ through $22_3$ are similarly constructed and controlled as that described above relative to multiplexers $38D_0$, $38C_0$, $38Q_0$, as evident from FIG. 2b.

According to this preferred embodiment of the invention, control logic 40 controls the operation of multiplexers 38, in their association of one of memory blocks 22 with one of buses FFT_BUS0, FFT_BUS1, DF_BUS, and M_BUS, in response to control signals from CPU 10. In the example of FIG. 2b, MEM_PAGE register 39 is a control register, in memory switch 20, that is writable by CPU 10 with control information for assigning the various buses FFT_BUS0, FFT_ BUS1, DF_BUS, and M_BUS to corresponding memory blocks 22. Control logic 40 issues control signals to each of multiplexers 38 in response to the contents of MEM_PAGE register 39.

Figure 5:
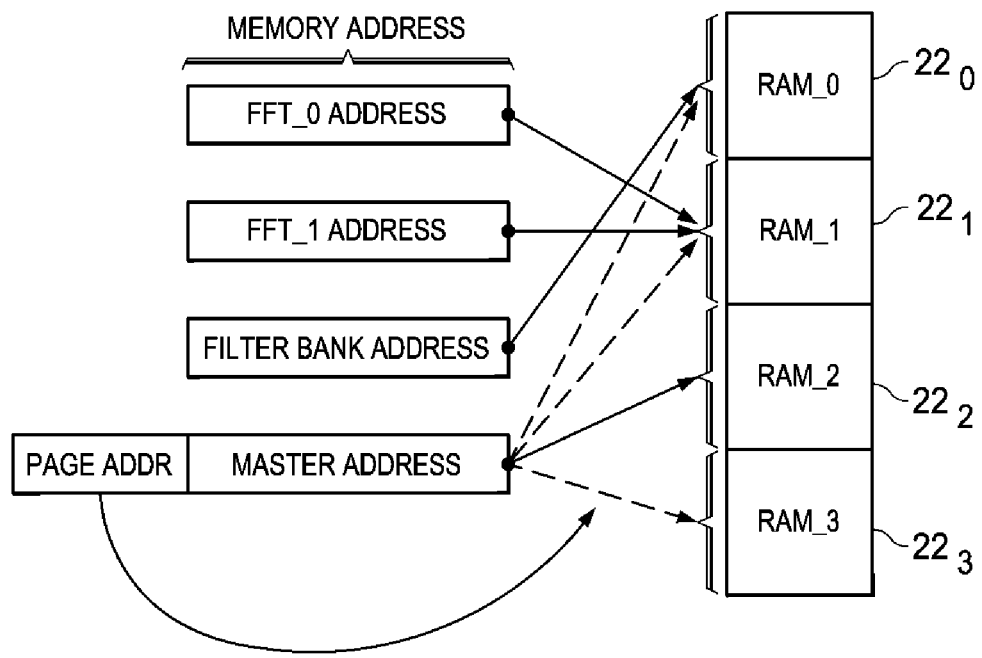
FIG. 5 is a memory map illustrating an example of the association between memory blocks of the memory switch of FIG. 2b, and address values communicated from the co-processor of FIG. 2a, according to the preferred embodiment of the invention.

The operation of multiplexers 38 in switch 25 thus associates one or more buses FFT_BUS0, FFT_BUS1, DF_BUS, and M_BUS to corresponding memory blocks 22. Considering this association, the address values carried within the control lines on each of these buses FFT_BUS0, FFT_BUS1, DF_BUS, and M_BUS will correspond to a memory location within that associated memory block 22. FIG. 5 illustrates an example of this association, and the mapping of memory addresses in an example of this operation. For example, address value FFT_0 ADDRESS corresponds to the address value carried on control lines FFT0_C of bus FFT_BUS0, which in this example is coupled to memory block $22_1$ by multiplexers $38C_1$ of switch 25. In this example, bus FFT_BUS0 and FFT_BUS1 are both coupled to memory block $22_1$ (to permit the retrieval of two operands, and the writing of two results, within an FFT sequence), bus DF_BUS is coupled to memory block $22_0$, and bus M_BUS is coupled to memory block $22_2$. The value of address FFT0_ADDRESS on bus FFT_BUS0 specifies an address within memory block $22_1$ but does not, according to this embodiment of the invention, include any bits that specify which of memory blocks 22 is to be selected. Rather, as described above, the selection of which memory block 22 is addressed from a particular functional unit or bus of co-processor 15 is controlled by the contents of MEM_PAGE register 39 and control logic 40. As far as each of the functional units of co-processor 15 are concerned, the memory space and size of memory switch 20 is that of one of memory blocks 22—these functional units (FFT unit 30, digital filter unit 32) are functionally unaware that more than one memory block 22 is contained within memory switch 20, and as such cannot select from among those multiple memory blocks 22.

According to this embodiment of the invention, however, the address value carried on control lines M_C of bus M_BUS coupled to bus slave 14 also includes additional bits, operating as a page address, which can specify one of memory blocks 22. In this example, because four memory blocks $22_0$ through $22_3$ are included within memory switch 20, this page address portion consists of two bits. The ability of bus slave 14 to specify individual ones of memory blocks 22 by way of an address value is preferred, according to this embodiment of the invention, for purposes of initialization, control, and debugging of the system, and also in carrying out the "overlap" if used in FFT and IFFT operations, as described below. In operation, however, control logic 40 will still continue to control multiplexers 38, and as such control logic 40 can receive these page address bits from bus M_BUS; the contents of the MEM_PAGE register 39 will still control the operation of multiplexers 38, however, such that an exception will be issued if the page address value does not match the association of bus M_BUS indicated by MEM_PAGE register 39.

As a result of this construction of memory switch 20, in combination with co-processor 15, blocks of data can be stored within memory switch 20 and processed by functional units within co-processor 15, with little additional overhead required by co-processor 15. In addition, these data blocks can be passed from one function to another, for example in a sequence of digital signal processing operations as can be carried out in modern electronic systems, without requiring reading and rewriting of these data blocks within the memory. An example of such a digital signal operation will now be described in connection with FIGS. 6 and 7.

Figure 6:
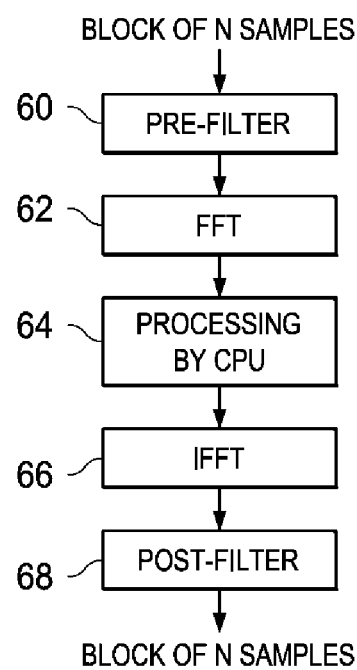
FIG. 6 is a flow diagram illustrating the operation of an example of a digital signal carried out by the co-processor and memory switch in a system constructed according to the preferred embodiment of the invention.

FIG. 6 illustrates an example of a typical data flow, in the system of FIG. 1, in a signal processing operation, such as processing audio input in a hearing aid. In this example, the digital data is processed in blocks, each block corresponding to a sequence of discrete sample values. Process 60 corresponds to a pre-filtering operation, in which digital filters are applied to a block of data representative of a sequence of N discrete sample values. After process 60, the pre-filtered block of data is processed by way of a Fast Fourier Transform (FFT) in process 62, transforming the filtered discrete sequence into the frequency domain, as conventional in the art. In process 64, CPU 10 performs some sort of data processing on the block of data, in this example with frequency domain data. Following this data processing, inverse FFT process 66 transforms the processed data back into the time domain, after which the block of data is post-filtered by way of digital filters, producing a block of N discrete data samples, for output or storage as appropriate for the system application.

Processing sequences such as shown in FIG. 6, in which blocks of data are processed by various operations, are especially well-suited for execution by the preferred embodiment of the invention, by way of the operation of co-processor 15 and memory switch 20. These processes are contemplated to be executed, in the system of FIG. 1, by way of CPU 10 executing a co-processor routine call operation, or some other program sequence in which co-processor 15 is enabled and operated to perform a routine on one or more blocks of data. As described above, memory switch 20 permits functional units of co-processor 15 to directly access selected memory blocks 22. This enables the results from one process to be directly accessed by a different functional unit, without reading and rewriting the data block, and in a manner that is transparent to the functional units within co-processor 15.

Figure 7:
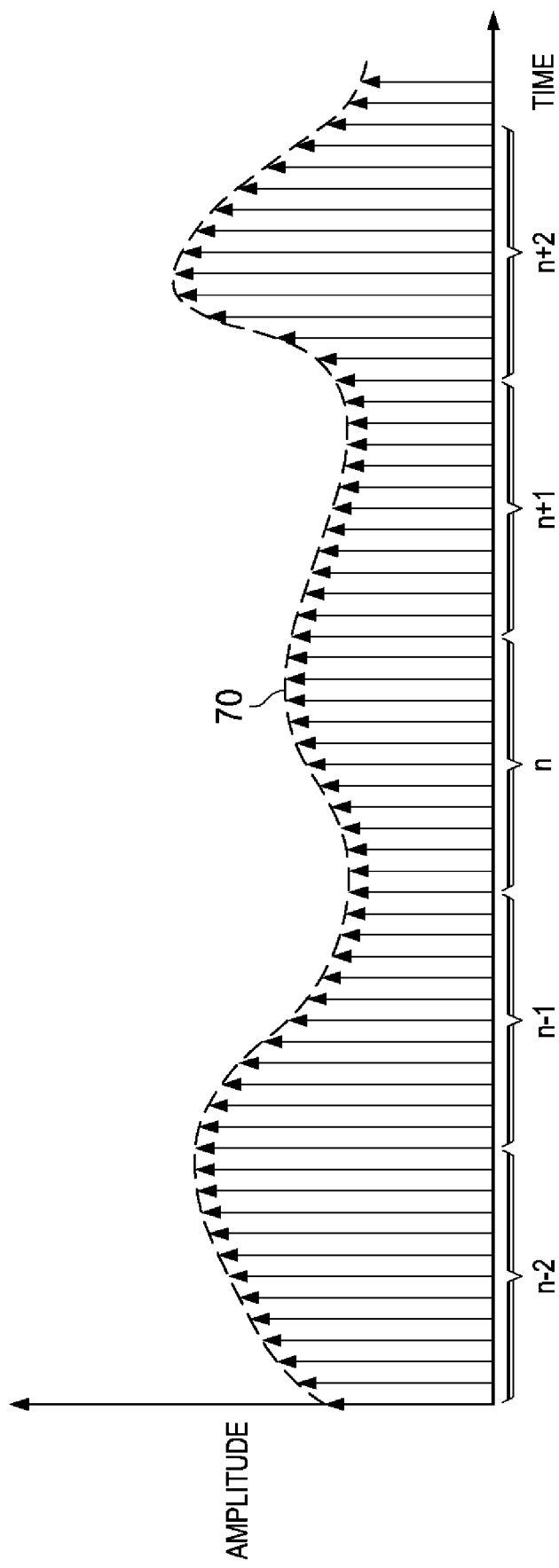
FIG. 7 is a timing diagram illustrating a sequence of time-domain samples of a signal, grouped into blocks, for purposes of explanation of an example of a sequence of operation of the process of FIG. 6, according to the preferred embodiment of the invention.

FIG. 7 illustrates sampled input signal 70 that, by way of example, is processed by co-processor 15 and memory switch 20, according to the sequence illustrated in FIG. 6 and according to the preferred embodiment of the invention. As shown in FIG. 7, the individual samples are grouped into blocks of samples, and the blocks are themselves ordered with reference to time (block n−2 precedes block n−1, which precedes block n, which precedes block n+1, etc.). According to the preferred embodiment of the invention, as evident from the foregoing description, the blocks of samples are stored in individual memory blocks 22, and processed as a block by the various functional units of co-processor 15 in sequence.

By way of example, the processing of FIG. 6 for a sequence of blocks of samples as shown in FIG. 7 will now be described. In this example, the processing time can be considered in cycles, or processing stages, in which control logic 40 and switch 25 associated individual ones of memory blocks 22 with a functional unit of co-processor 15, or with bus slave unit 14 (or, perhaps, with no bus or functional unit, as the case may be). Following the process flow of FIG. 6, an example of this association, for a sequence of processing stages in processing a sequence of blocks of samples, is:

|  | Memory block $22_0$ (RAM_0) | Memory block $22_1$ (RAM_1) | Memory block $22_2$ (RAM_2) | Memory block $22_3$ (RAM_3) |
| --- | --- | --- | --- | --- |
| Stage 1 | Bus slave 14 for DMAOUT(n – 3)$_{Hz}$ | Bus slave 14 for MAIN(n)$_t$ | Filter unit 32 for Pre-filter(n – 1)$_t$ | FFT unit 30 for FFT(n – 2)$_t$ |
| Stage 2 | Bus slave 14 for MAIN(n – 3)$_{Hz}$ | Filter unit 32 for Pre-filter(n)$_t$ | FFT unit 30 for FFT(n – 1)$_t$ | Bus slave 14 for DMAOUT(n – 2)$_{Hz}$ |
| Stage 3 | FFT unit 30 for IFFT(n – 3)$_{Hz}$ | FFT unit 30 for FFT(n)$_t$ | Bus slave 14 for DMAOUT(n – 1)$_{Hz}$ | Bus slave 14 for MAIN(n – 2)$_{Hz}$ |
| Stage 4 | Filter unit 32 for Post-filter(n – 3)$_t$ | Bus slave 14 for DMAOUT(n)$_{Hz}$ | Bus slave 14 for MAIN(n – 1)$_{Hz}$ | FFT unit 30 for IFFT(n – 1)$_{Hz}$ |
| Stage 5 | Bus slave 14 for DMAOUT(n – 3)$_t$ | Bus slave 14 for MAIN(n)$_{Hz}$ | FFT unit 30 for IFFT(n – 1)$_{Hz}$ | Filter unit 32 for Post-filter(n – 1)$_t$ |
| Stage 6 | Bus slave 14 for MAIN(n + 1)$_t$ | FFT unit 30 for IFFT(n)$_{Hz}$ | Filter unit 32 for Post-filter(n – 1)$_t$ | Bus slave 14 for DMAOUT(n – 1)$_t$ |
| Stage 7 | Filter unit 32 for Pre-filter(n + 1)$_t$ | Filter unit 32 for Post-filter(n)$_t$ | Bus slave 14 for DMAOUT(n – 1)$_t$ | Bus slave 14 for MAIN(n + 2)$_t$ |
| Stage 8 | FFT unit 30 for FFT(n + 1)t | Bus slave 14 for DMAOUT(n)$_t$ | Bus slave 14 for MAIN(n + 3)$_t$ | Filter unit 32 for Pre-filter(n + 2)$_t$ |

This table illustrates which functional units are associated with which memory block within each processing stage, and the operation of the process flow of FIG. 6 that is carried out in that stage, on the data block stored in that memory block. Referring first to memory block $22_1$, bus slave unit 14 is coupled to memory block $22_1$, in processing stage 1 of this example, during which time main CPU 10 is writing the data values of the samples in block n (FIG. 7) into memory block $22_1$. The subscript "t" of the indicator MAIN(n)$_t$ indicates that the data values being written to memory block $22_1$, are time-domain values (the subscript "Hz" indicates that the data values are in the frequency domain). In processing stage 2, memory block $22_1$ is associated with filter unit 32, which performs pre-filter operation 60 (FIG. 6) on the data samples of block n stored in memory block $22_1$ during that stage. The result of this pre-filter operation 60, for sample block n, and stored in memory block $22_1$ are coupled to FFT unit 30 in processing stage 3, during which FFT unit 30 performs FFT operation 62 on those filtered data values. In processing stage 4, memory block $22_1$ is associated with bus slave 14, for communication of the frequency-domain results of FFT process 62 on block n, to CPU 10 for frequency-domain processing operation 64. In processing stage 5, memory block $22_1$ is again associated with bus slave 14, to receive the processed data for block n from CPU 10, after its signal processing of process 64. In processing stage 6, memory block $22_1$ is associated with FFT unit 30, which performs an inverse FFT (process 66) on the frequency-domain values for block n, returning time-domain data values to memory block $22_1$. In processing stage 7, memory block $22_1$ is associated with filter unit 32, which performs post-filter operations on the time-domain values then stored in memory block $22_1$ for sample block n. And in processing stage 8, bus slave 14 is associated with memory block $22_1$, to retrieve the results of the processing of FIG. 6 and to write these results, preferably via a DMA operation, into system memory 12.

As evident from following the processing of a single block of sample values (e.g., block n discussed above), the data values for this sample block can remain within the same memory block 22 throughout its processing. The various functional units (FFT unit 30, filter unit 32, bus slave 14) are merely associated with this memory block 22, and communicate therewith in sequence. As such, the data values for each block of samples can remain in place in its memory block 22; the reading and rewriting of these values to or between memory blocks between co-processor operations to allow access of the values to different functional units is not performed. As a result, the efficiency of the processing routine is improved because such reading and rewriting are not performed. Furthermore, the power consumed by the system is reduced because such moving of data is not required, thus saving at least two cycles per data word.

Meanwhile, the other memory blocks 22 are associated with other functional units in co-processor 15 or with bus slave unit 14, to further improve the efficiency of the system by executing the process of FIG. 6 in a pipelined fashion. For example, in processing stage 1, bus slave 14 is coupled to memory block $22_0$ so that a DMA read retrieves the frequency-domain values for sample block n–3, filter unit 32 is coupled to memory block $22_2$ to perform pre-filter operation 60 on sample block n–1, and FFT unit 30 is coupled to memory block $22_3$ to perform FFT operation 62 on the data values for sample block n–2. The sequences of processes 60 through 68 are thus performed on up to four sample blocks at a time, through the operation of co-processor 15 and memory switch 20. As an aside, a particular functional unit may be in communication with more than one memory block 22 within a given processing stage as shown in this table; for example, bus slave 14 is coupled to memory block $22_0$ for some part of processing stage 1, and also to memory block $22_1$ for another portion of processing stage 1 (one may also consider these two connections to correspond to two separate processing "stages", in which case the coupling of filter unit 32 to memory block $22_2$ and of FFT unit 30 to memory block $22_3$ would extend over two such "stages".). It is preferred that FFT unit 30 and filter unit 32 be connected to one and only one memory block 22 at a time, to avoid data and bus conflicts; bus slave 14 may be coupled to two memory blocks 22 to carry out an "overlap" operation, as will be described below, but otherwise is preferably coupled to only one memory block 22 at a time.

In this embodiment of the invention, as evident from the above table and description, memory switch 20 advances the association of the various buses FFT_BUS0, FFT_BUS1, DF_BUS, and M_BUS with memory blocks 22, from processing stage to processing stage, so that the results of the previous stage's operation can be processed in a next stage in the data flow of FIG. 6. This advancing of the association of buses FFT_BUS0, FFT_BUS1, DF_BUS, and M_BUS with memory blocks 22 may be performed by CPU 10 writing new control information into MEM_PAGE register 39. Alternatively, co-processor 15 may be executing a higher-level programming language instruction (i.e., a "macro") in which control logic 40 automatically advances the association of buses to memory blocks. In either case, control logic 40 controls multiplexers 38 to coherently couple its memory blocks 22 to the desired corresponding functional unit.

These operational stages and processes, as carried out by the functional units of co-processor 15 in combination with memory switch 22, continue in a similar manner according to the data flow of FIG. 6 continue as long as specified by the co-processor call or instruction sequence initiated by CPU 10, as appropriate for system operation.

As known in the art, it is useful to perform FFT/IFFT operations on a block of data that includes not only the block being processed, but also samples from an adjacent block that are adjacent in time to those being processed. By using samples from adjacent blocks, this overlap FFT/IFFT processing results in a spectral smoothing of the resulting characteristic, avoiding artifacts that can occur at a frequency related to the block size. According to this embodiment of the invention, overlap operations are performed by bus slave 14 writing data values in the "overlap" region of a data block into two memory blocks 22, one memory block 22 receiving the entire data block to be transformed, and a second memory block 22 receiving the overlapping samples.

Referring now to FIGS. 8a through 8c, the operation of memory switch 20 according to this preferred embodiment of the invention, in effecting an FFT operation using overlap, will now be described. In this example, the data block size for the FFT is eight samples, and the overlap is two samples; this means that the FFT (or IFFT, as the case may be) is performed over an eight sample data block, two samples of which also appeared in the immediately previous data block to which the transform was applied. Similarly, two samples in the current data block will also be present in the next data block to which the transform is applied, and so on.

In the architecture of memory switch 20 described above, the overlap is preferably enabled by CPU 10 writing MEM_PAGE register 39 with control contents that assign one of memory blocks 22 as an "FFT overlap" block, and that set a value indicating the length (in samples) of the overlap (in this example, two samples). FIG. 8a illustrates the initial stage of memory block $22_0$ to which data will be written, and upon which an FFT or IFFT operation will be performed, using the optional overlap technique. In FIG. 8a, memory block $22_0$ is empty, except for its first two entries, which contain "overlap" samples $x(-2)$ and $x(-1)$ that are also contained in a previous data block. Memory block $22_0$ is associated with bus slave 14 at this point, and is indicated as the memory block $22_0$ to which a DMA or other data write operation of new samples will be performed, while memory block $22_1$ is identified as an "FFT overlap" block, and also associated with bus slave 14.

FIG. 8b illustrates the state of memory blocks $22_0$ and $22_1$ after the writing of data by way of DMA via bus slave 14 for the FFT operation. In this example, the first new sample $x(0)$ is written to the first available memory entry or address of memory block $22_0$, namely the third entry in this example. An efficient way to calculate this first memory address, according to this preferred embodiment of the invention, is to add a value corresponding to overlap length (e.g., as may be stored in MEM_PAGE register 39) to the initial address of the memory block 2. For example, as shown in FIG. 8b and considering previous overlap value $x(-2)$ to be at address [0], the first new entry $x(0)$ is written to address [2], or address [0+(overlap_length=2)]. The DMA of new data for FFT processing is then continued until memory block $22_0$ is full, which in this case is upon sample $x(5)$ written to memory block $22_0$ at address [7]. Memory block $22_0$ then has a full complement of eight sample values, and is then ready for FFT or IFFT processing, or digital filtering as desired.

However, because memory block $22_1$ is identified as an "FFT overlap" block, and because the "overlap length" is two samples, the last two samples written to memory block $22_0$ are also written into memory block $22_1$, also by way of a DMA operation via bus slave 14. Referring back to FIG. 5, it is contemplated that this addressing of the FFT overlap memory block $22_1$ is performed by bus slave 14, using its page address portion (i.e., the portion of the memory address beyond that required to select a location within a memory block). In this operation, therefore, the full address presented by bus slave 14 may refer either to the memory block assigned to bus slave 14, or to the "FFT overlap" block, without throwing an exception. As a result of this extended DMA write of the overlap values, the entry of memory block $22_1$ at address [0] receives the next-to-last sample value $x(4)$ written into memory block $22_0$, and the entry of memory block $22_1$ at address [1] receives the last sample value $x(5)$ written into memory block $22_0$. These two samples $x(4)$ and $x(5)$ are thus written to both memory block $22_0$ and to memory block $22_1$. Memory block $22_0$ may now be processed according to the desired FFT operation, and its contents changed by way of in-place processing as described above.

This process of writing data samples into memory blocks 22 continues, with the writing of the next block as shown in FIG. 8c. At this point in the execution of the process, memory block $22_1$, still retains the overlap samples $x(4)$ and $x(5)$ written when that block was the "FFT overlap" block, and now receives new data samples $x(6)$ through $x(11)$ to fill out its eight-sample capacity. At this point, memory block $22_2$ is identified as the "FFT overlap" block, and receives a copy of the last two data samples $x(10)$ and $x(11)$ written to memory block $22_1$. The contents of memory block $22_1$, are now ready for FFT or IFFT processing, while the overlapped samples $x(10)$ and $x(11)$ are retained within memory block $22_2$ as shown.

As a result of this construction of the co-processor architecture including the overlap provision, complex FFT and IFFT operations may be carried out with improved spectral characteristics. The overlapping in this manner is performed in a manner that is entirely transparent to co-processor 15, reducing the extent of overhead operations required of the co-processor, and thus reducing computational complexity and also power dissipation.

According to the preferred embodiment of the invention, therefore, important advantages in computer architecture are attained, particularly in the ability to efficiently process data blocks for use in a sequence of block data processing operations. Co-processor operation is facilitated by reducing the resource management overhead, and substantial power savings result from maintaining copies of data operands and results in place in memory, avoiding reading and rewriting of memory as sequences of processes are carried out. It is contemplated that this invention is especially advantageous in modern digital signal processing applications, particularly those that are battery-powered and thus in which power consumption is a substantial limitation.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A co-processor subsystem comprising:
a co-processor having Fast Fourier Transform (FFT) circuitry and digital filter circuitry;
a bus slave circuit; and
a memory switch including:
a plurality of memory blocks;
switch circuitry having a plurality of transmission terminals and a plurality of selection terminals, wherein the FFT circuitry is coupled to at least one of the transmission terminals, and wherein the digital filter circuitry is coupled to at least one of the transmission terminals, and wherein the bus slave circuit is coupled to at least one of transmission terminals, and wherein each memory block is coupled to at least one of the transmission terminals, and wherein the switch circuitry is adapted to couple at least one of the functional units to at least one of the memory blocks, and wherein the switch circuitry is adapted to coupled the bus slave circuit to at least one of the memory blocks;
a control register; and
control logic that is coupled to the control register and the selection terminals, wherein the control logic that controls the switch circuitry based at least in part on the contents of the control register.

2. The co-processor subsystem of claim 1, further comprising:
a plurality of functional unit buses, wherein each functional unit bus is coupled to at least one of the FFT circuitry and the digital filter circuitry and to at least one of the transmission terminals; and
a master bus that is coupled to the bus slave circuit and to at least one of the transmission terminals.

3. The co-processor subsystem of claim 2, wherein at least one of the functional unit buses further comprises data lines and address lines.

4. The co-processor subsystem of claim 3, wherein the master bus comprises data lines and address lines.

5. The co-processor subsystem of claim 2, wherein the switch circuitry further comprises a plurality of multiplexers, wherein at least one multiplexer is associated with each of the plurality of memory blocks.

6. The co-processor subsystem of claim 5, wherein the co-processor further comprises a read-only memory for storing weighting factors and digital filter coefficients.

7. A data processing system comprising:
a central processing unit (CPU) that is coupled to a system bus;
a co-processor having FFT circuitry and digital filter circuitry;
a bus slave circuit that is coupled to the system bus; and
a memory switch, including:
a plurality of memory blocks; and
switch circuitry that is coupled to each of the memory block, wherein the switch circuitry is adapted to coupled at least one of the FFT circuitry, the digital filter circuitry, and the bus slave circuit to at least one of the memory blocks;
a plurality of functional unit buses, wherein each functional unit bus is coupled to the switch circuitry, and wherein the FFT circuitry is coupled to at least one of the functional unit busses, and wherein the digital filter circuitry is coupled to at least one of the functional unit busses, and wherein the first functional unit bus includes data lines and address lines, and wherein the address lines of the first functional unit bus are of a sufficient number to select a memory location within one of the plurality of memory blocks;
a master bus that is coupled to the bus slave circuit and the switch circuitry, wherein the master bus includes data lines and address lines, and wherein the address lines of the master bus are of a sufficient number to select one of the plurality of memory blocks, and to select a memory location within the selected memory block.

8. The system of claim 7, wherein the memory switch further comprises:
a control register that is adapted to receive instructions from the CPU; and
control logic that is coupled to the control register and to the switch circuitry, wherein the control logic controls the switch circuitry based at least in part on the contents of the control register.

9. The system of claim 8, wherein the switch circuitry further comprises:
a plurality of multiplexers, wherein each multiplexer is coupled to at least one of memory blocks, and wherein each multiplexer has inputs coupled to each functional unit bus and to the master bus, and wherein each multiplexer is controlled by the control logic.

10. The system of claim 7, wherein the co-processor further comprises a read-only memory for storing weighting factors and digital filter coefficients.

11. An apparatus comprising:
a bus slave circuit that is adapted to be coupled to a system bus;
a co-processor having:
FFT circuit;
digital filter circuit; and
an internal memory block that is coupled to FFT circuit and the digital filter circuitry;
an FFT bus that is coupled to the FFT circuitry;
a filter bus that is coupled to the digital filter circuit;
a master bus that is coupled to the bus slave circuit;
memory switch having:
a plurality of memory blocks;
a plurality of input multiplexers, wherein each input multiplexer is coupled to the FFT bus, the filter bus, and the master bus, and wherein each input multiplexer is coupled to at least one of the memory blocks;
a control register; and
control logic that is coupled to the control register and each input multiplexer, wherein the control logic controls the each input multiplexer based at least in part on the contents of the control register.

12. The apparatus of claim 11, wherein the memory switch further comprises a plurality of output multiplexers, wherein each output multiplexer is coupled to the FFT bus, and wherein each output multiplexer is coupled to each of the memory blocks, and wherein each output multiplexer is controlled based at least in part on the contents of the control register.

13. The apparatus of claim 12, wherein the FFT circuitry further comprises a plurality of datapaths, wherein each datapath includes:
a first multiplier that is coupled to the FFT bus and to the internal memory block;
a second multiplier that is coupled to the FFT bus and to the internal memory block;
a first adder that is coupled to the FFT bus, to the first multiplier, and to the second multiplier;
a second adder that is coupled to the FFT bus, to the first multiplier, and to the second multiplier;

a first overflow detection and saturation circuit that is coupled to the first adder;

a second overflow detection and saturation circuit that is coupled to the second adder;

a first register that is coupled to the first overflow detection and saturation circuit;

a second register that is coupled to the second overflow detection and saturation circuit; and scaling logic that is coupled to the first register, the second register, and the FFT bus.

14. The apparatus of claim 11, wherein the digital filter circuitry further comprises:

a local random access memory (RAM);

a first filter multiplexer that is coupled to the local RAM;

a second filter multiplexer that is coupled to the local RANT and to the filter bus;

a multiplier that is coupled to the first and second filter multiplexers;

an adder that is coupled to the multiplier;

an accumulator register that is coupled to the adder;

an AND gate that is coupled to the accumulator register and to the adder; and scaling logic that is coupled to the accumulator register.

* * * * *

UNITED STATES PATENT AND TRADEMARK OFFICE
CERTIFICATE OF CORRECTION

PATENT NO. : 7,587,577 B2 Page 1 of 1
APPLICATION NO. : 11/557755
DATED : September 8, 2009
INVENTOR(S) : Marc E. Royer et al.

It is certified that error appears in the above-identified patent and that said Letters Patent is hereby corrected as shown below:

On the Title Pg. Item (75) correct the names of the fifth and seventh inventors:

fifth inventor from "Pedro R. Galabert" to --Pedro R. Gelabert.-- seventh inventor from "Samil D. Kamath" to --Sunil D. Kamath.--

Signed and Sealed this

Ninth Day of March, 2010

David J. Kappos
*Director of the United States Patent and Trademark Office*